(12) United States Patent
Eberspächer et al.

(10) Patent No.: US 6,440,031 B1
(45) Date of Patent: Aug. 27, 2002

(54) GEARBOX WITH GEAR SYNCHRONIZING DEVICE

(75) Inventors: Ralph Eberspächer, Althengstett; Günter Wörner, Kernen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/647,629

(22) PCT Filed: Mar. 23, 1999

(86) PCT No.: PCT/EP99/01947

§ 371 (c)(1),
(2), (4) Date: Dec. 1, 2000

(87) PCT Pub. No.: WO99/51891

PCT Pub. Date: Oct. 14, 1999

(30) Foreign Application Priority Data

Apr. 1, 1998 (DE) .......................................... 198 14 569

(51) Int. Cl.[7] .............................................. F16H 37/04
(52) U.S. Cl. .......................................... 475/207; 74/339
(58) Field of Search .................. 74/339, 340; 475/207, 475/302, 303, 311, 313, 323, 325

(56) References Cited

U.S. PATENT DOCUMENTS

| | | | | | |
|---|---|---|---|---|---|
| 3,570,636 A | * | 3/1971 | Franz | .......................... | 475/207 |
| 3,736,814 A | * | 6/1973 | Herr | ............................. | 74/339 |
| 4,614,126 A | * | 9/1986 | Edelen et al. | ................. | 74/339 |
| 4,726,245 A | * | 2/1988 | Klaue | .......................... | 74/339 |
| 5,974,905 A | * | 11/1999 | Hedman | ...................... | 74/339 |

FOREIGN PATENT DOCUMENTS

| | | |
|---|---|---|
| EP | 0 202 800 | 11/1986 |
| FR | 1003128 | 12/1946 |
| FR | 2674928 | 4/1991 |
| WO | WO 91/10079 | 12/1990 |
| WO | WO 91/13271 | 12/1990 |

* cited by examiner

*Primary Examiner*—Sherry Estremsky
(74) *Attorney, Agent, or Firm*—Kenyon & Kenyon

(57) ABSTRACT

In a change-speed gearbox with gear wheel clutches without synchronizing elements, a synchronizing gear mechanism is provided to accelerate or decelerate the input shaft to the respective synchronous speed of the new gear.

20 Claims, 7 Drawing Sheets

GEARBOX WITH GEAR SYNCHRONIZING DEVICE

FIELD OF THE INVENTION

Figure 1:
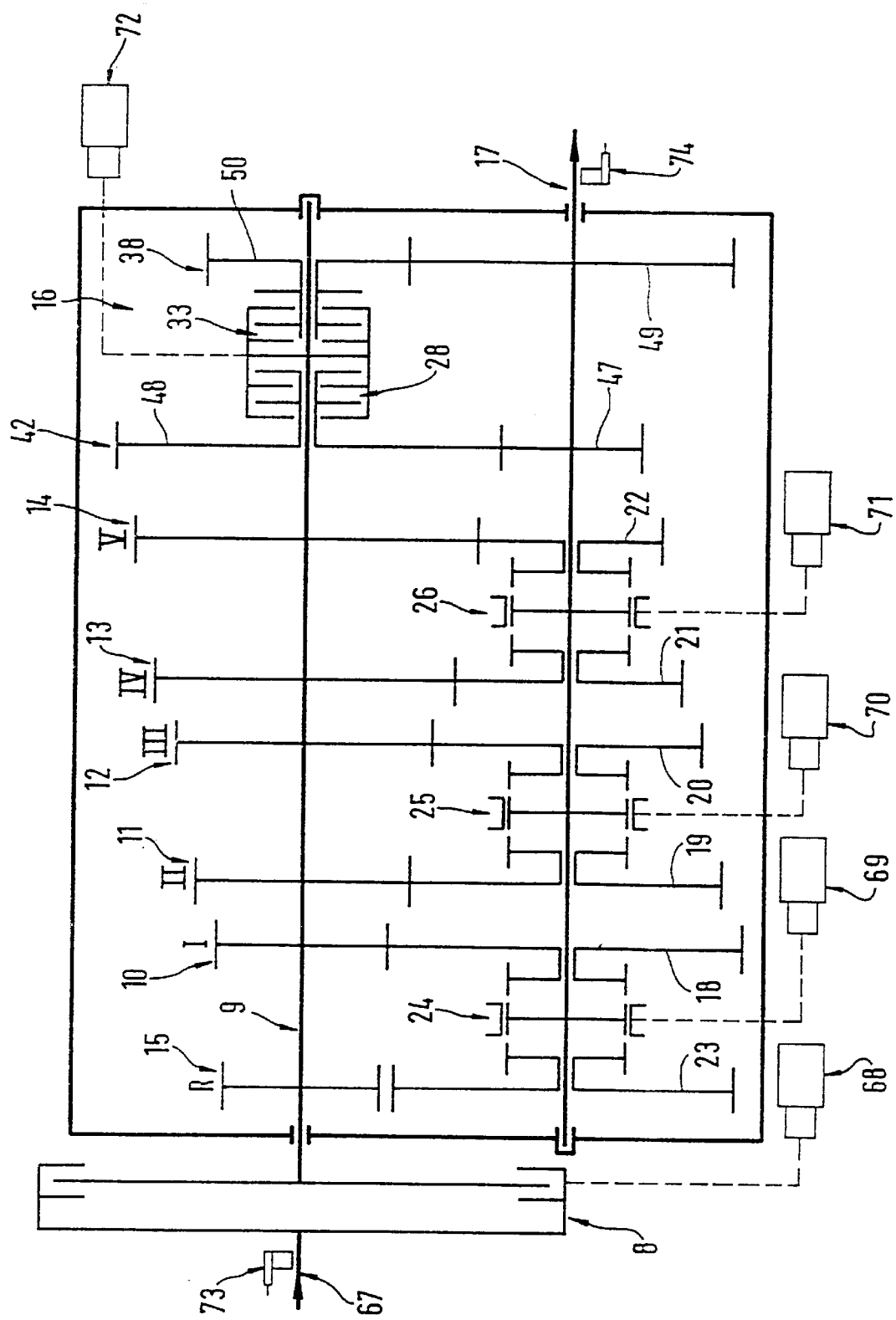

The invention relates to a change-speed gearbox.

BACKGROUND

In a known change-speed gear mechanism of the type stated at the outset (FR 1.003.128) it is necessary that both the step interval between the gears should always be the same and that the relationship between the transmission ratios of the gear wheel stages of the synchronizing mechanism should be equal to the constant step interval between the gears. As a result, synchronization can only be performed if the gears are selected sequentially—in other words not if selection involves skipping one or more gears—and only with the main clutch disengaged. In one embodiment of this known change-speed gearbox, the synchronizing mechanism is controlled in such a way by a control device operating as a function of the engine speed that the gear wheel stage having the transmission ratio greater than 1 is used when a lower limiting value of the engine speed is reached and the other gear wheel stage is used when an upper limiting value of the engine speed is reached.

In a known change-speed gearbox of the layshaft type (WO 91/13271 A1), which does not belong to the generic type, gear wheel clutches without synchronizing elements for the gear wheel stages associated with the gears and a central synchronizing mechanism are provided. Gear changes are performed in the manner of a power shift with the main clutch engaged, by way of the synchronizing mechanism, which is used in the form of a gear wheel stage with a transmission ratio equal to or less than the transmission ratio of the highest forward gear or in the form of an infinitely variable friction mechanism with an endless wraparound means that connects adjustable conical drive pulleys. In this known change-speed gearbox, the synchronizing mechanism can only be effective in the case of gear changes with the engine in traction mode - conditions for synchronization in the case of gear changes with the engine in over drive mode are not discussed in this publication.

In another known change-speed gearbox (EP 0 202 800 B1) of a different type, a two-stage rear-mounted transmission is arranged after a main layshaft-type gearbox with five forward gears and one reverse gear in the power transmission path, the said transmission doubling the number of gears of the main gearbox. Arranged between the two coaxial layshafts of the main gearbox and the rear-mounted transmission in the power transmission path is a synchronizing gear mechanism in the form of an epicyclic mechanism, the planet carrier of which is in continuous drive connection with the output shaft of the main gearbox via the layshaft of the rear-mounted transmission—the outer central wheel of which can be braked by means of a friction brake, which is engaged in the "downshift" synchronization state—and the inner central wheel of which is both continuously connected to the layshaft of the main gearbox and can be braked by means of another friction brake, which is engaged in the "upshift" synchronization state. In this known change-speed gearbox, the main clutch is disengaged during each gear change, with the result that power shifts are not possible, and the synchronizing gear mechanism's brake, which acts directly on the layshaft of the main gearbox, would dissipate valuable driving energy in the event of a hypothetical gear change performed with the main clutch engaged.

The object underlying the invention is essentially to be regarded as enabling gear changes, including those which involve skipping several gears, i.e. freely selectable gear changes with a power-shift character, without unnecessary dissipation of driving energy.

SUMMARY

In the change-speed gearbox according to the invention, the power flow is limited to only an insignificant extent during the gear change because the engine remains connected continuously to the output shaft owing to the retention of the engaged state of the main clutch, and a transmission state with a definitive transmission ratio is set in the synchronizing gear mechanism during synchronization, even in the case of an upshift. Compared with a conventional gear change mechanism with a synchronizing process which involves a complete interruption of torque transmission, in all cases an improvement in the direction of a power shift character with the change-speed gearbox according to the invention is achieved.

In the change-speed gearbox according to the invention, the outlay in terms of construction is advantageously reduced by using both gear wheel stages of the synchronizing gear mechanism both for synchronizing and to form a gear ratio.

In the change-speed gearbox according to the invention, the fact that that gear wheel stage of the synchronizing mechanism which has the transmission ratio greater than 1 operates independently of the main clutch means that freely selectable gear changes with a power shift character are possible even with the engine in overdrive mode.

In embodiments of the change-speed gearbox the use of gear wheel stages in the form of a respective stationary transmission for the synchronizing gear mechanism has proven advantageous.

In other embodiments of the change-speed gearbox according to the invention, it was possible to keep the installation space in the directions of the transmission shafts particularly low by using an epicyclic mechanism for one gear wheel stage of the synchronizing gear mechanism in accordance with.

Other embodiments of the change speed gearbox relate to an advantageous way of incorporating the epicyclic mechanism forming one gear wheel stage of the synchronizing gear mechanism into the change-speed gearbox according to the invention.

Other embodiments of the change speed gearbox relate to the configuration of the epicyclic mechanism used as one gear wheel stage of the synchronizing gear mechanism in the change-speed gearbox according to the invention, part-ratios of two of these embodiments being used to form respective gear ratios.

In one embodiment of the change speed gearbox, also provided to form gear ratios, of an epicyclic mechanism, which is designed as a gear wheel stage of the synchronizing gear mechanism in the change-speed gearbox.

An advantageous embodiment of an epicyclic mechanism, in particular one which is short in the axial direction, having part-ratios for a reverse gear and at least one forward gear, which mechanism can be used as a gear wheel stage of a synchronizing gear mechanism in the change-speed gearbox according to the invention.

In the change-speed gearbox configuration as a two- or three-shaft gearbox in accordance with certain embodiments of the invention has proven advantageous.

In the change-speed gearbox according to the invention, the following advantages have essentially been achieved:

A synchronizing gear mechanism with two gear wheel stages, one of which can be designed as an epicyclic mechanism, enables the input shaft of the change-speed gearbox to be accelerated or decelerated by means of its output shaft.

The gear wheel stages of the synchronizing mechanism can balance at least the transmission ratio of the highest gear stage (e.g. between first gear and second gear). A larger spread for this transmission ratio is possible to enable several gears to be skipped by means of just one gear change operation. This means that a gear change can take place without restrictions on the choice available.

The synchronizing gear mechanism or its gear wheel stages can themselves form the transmission ratio of one or more forward gears (e.g. the lowest and the highest) and/or of the reverse gear. This considerably reduces the installation space, the weight and costs. The invention is described in greater detail below by

BRIEF DESCRIPTION OF THE INVENTION

Figure 2:
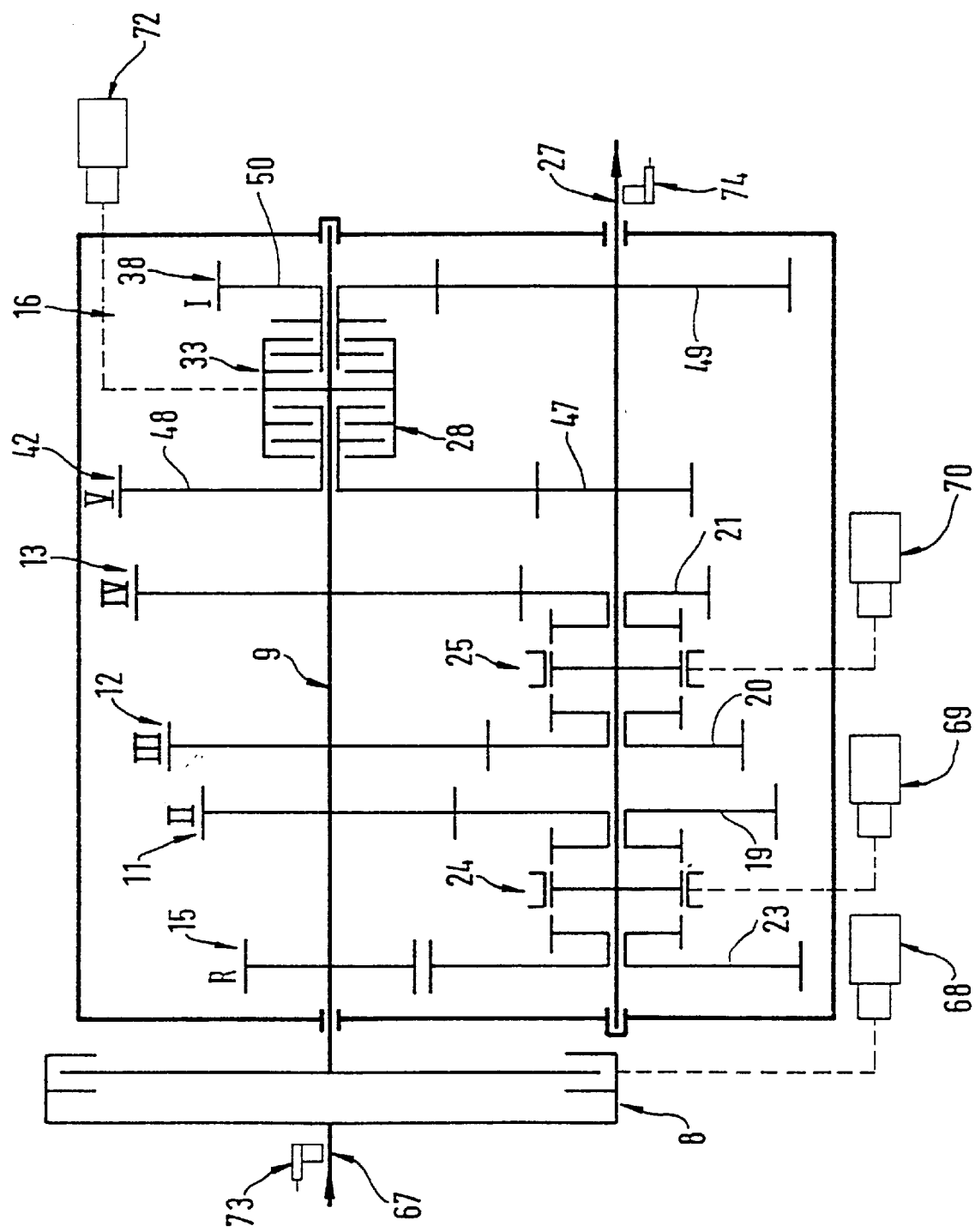
Figure 3:
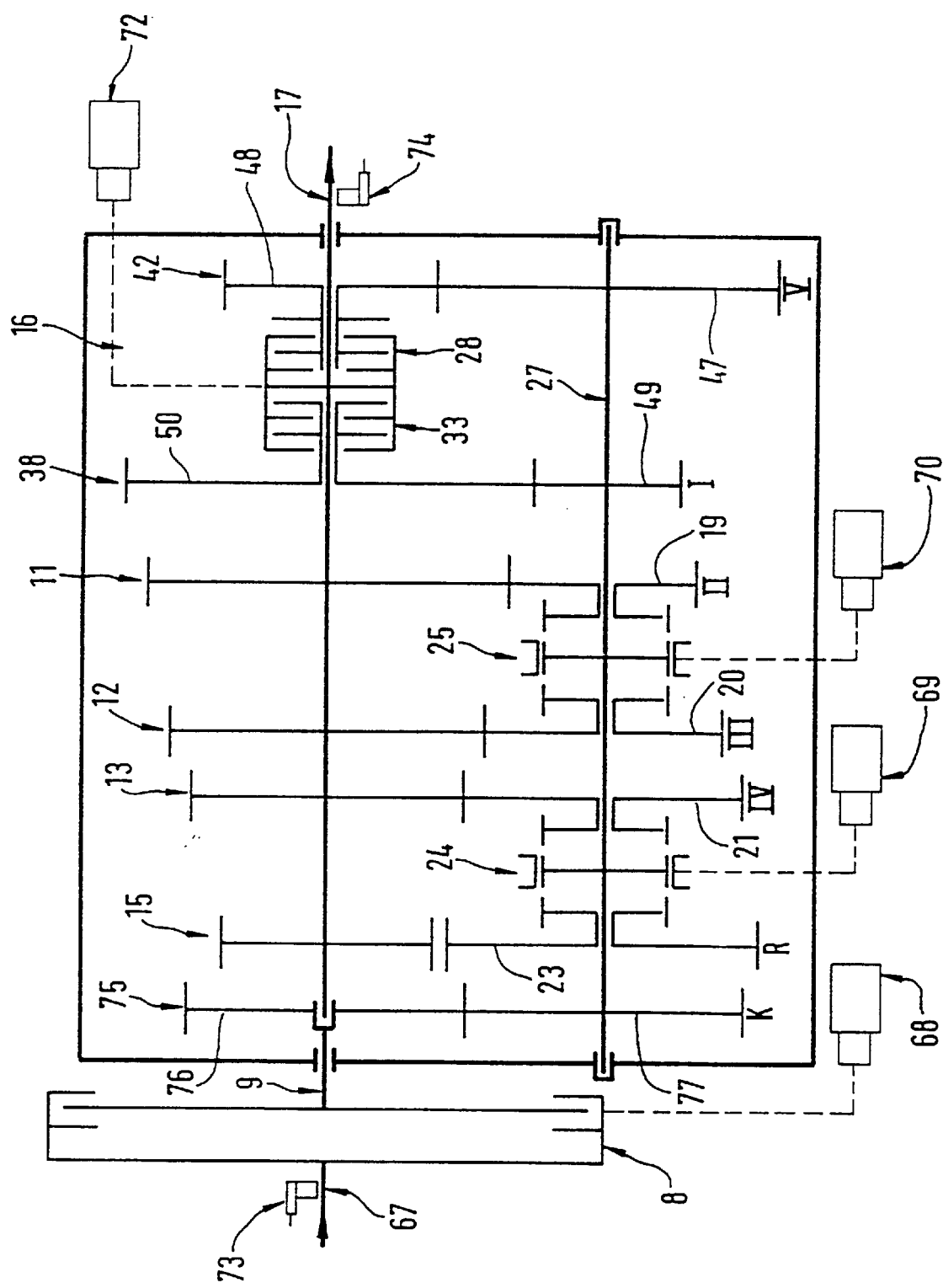
Figure 4:
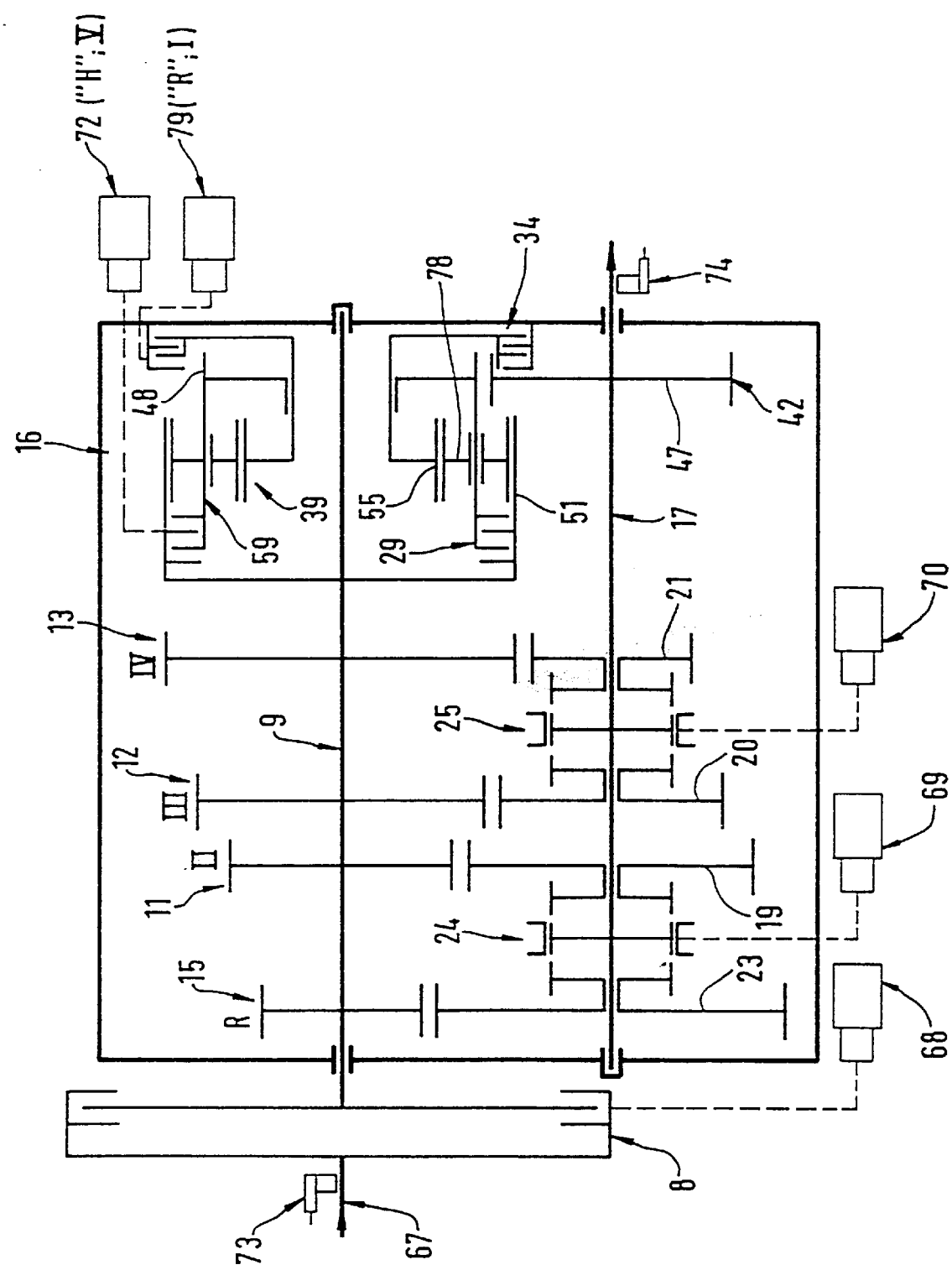
Figure 5:
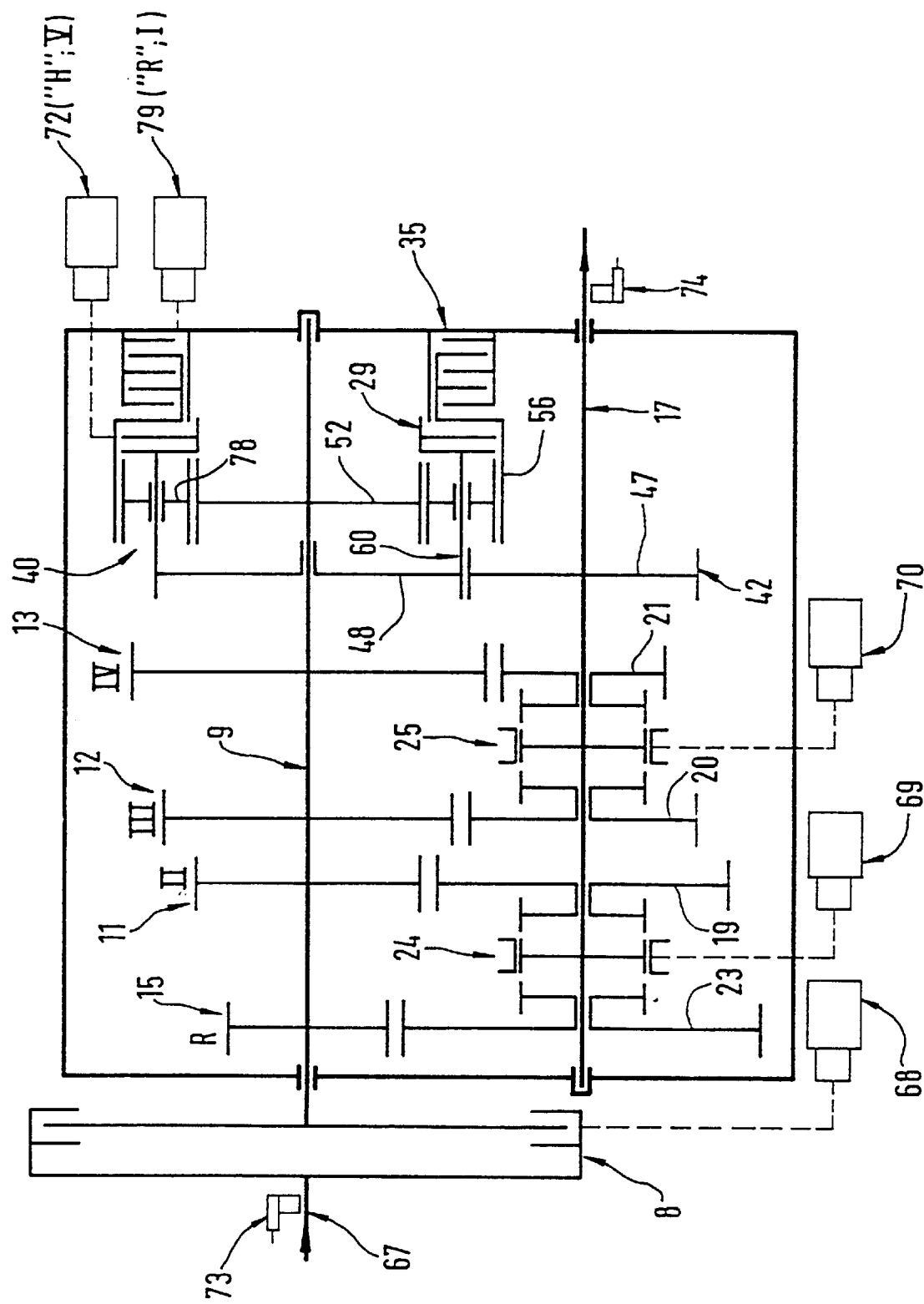
Figure 6:
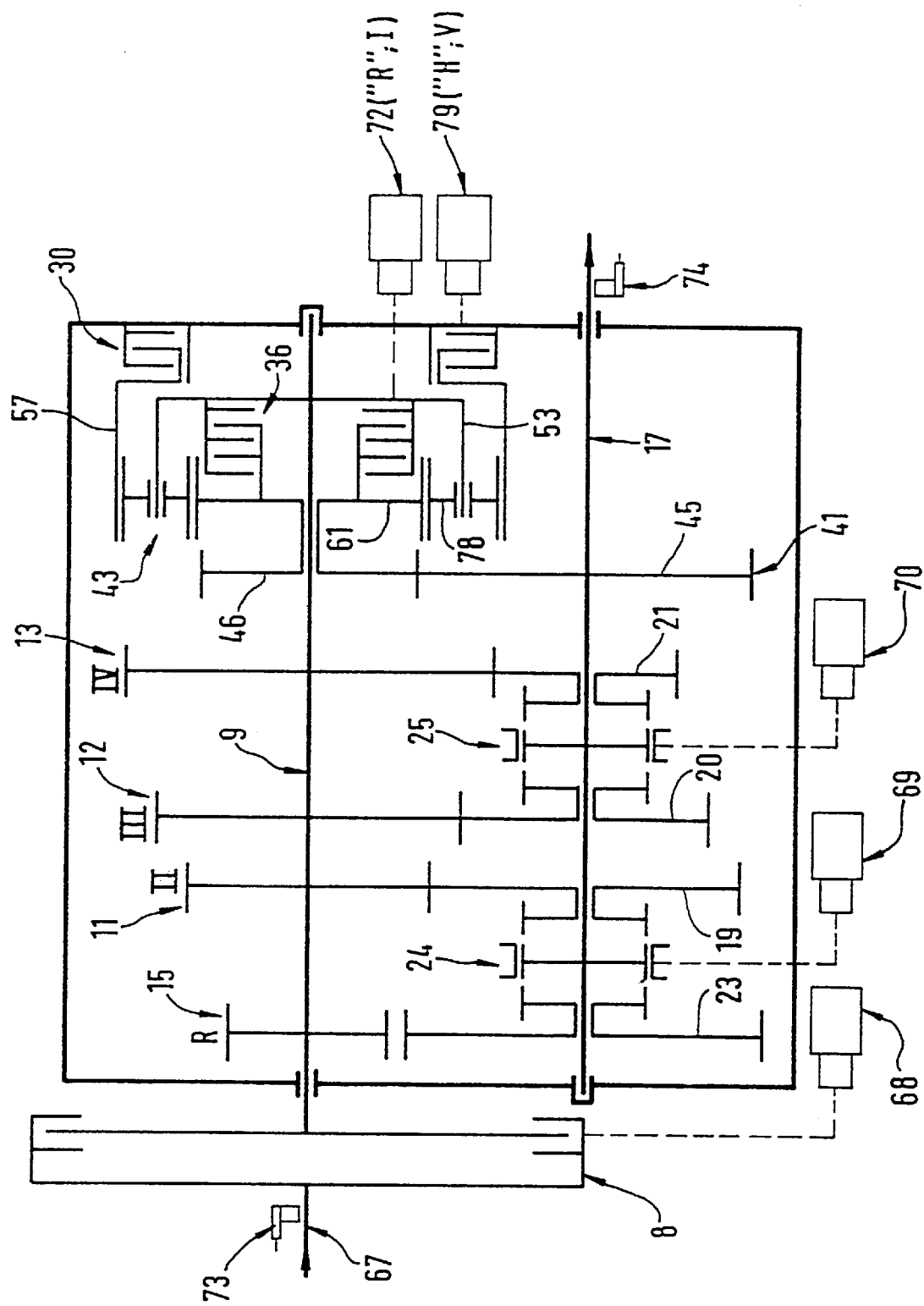
Figure 7:
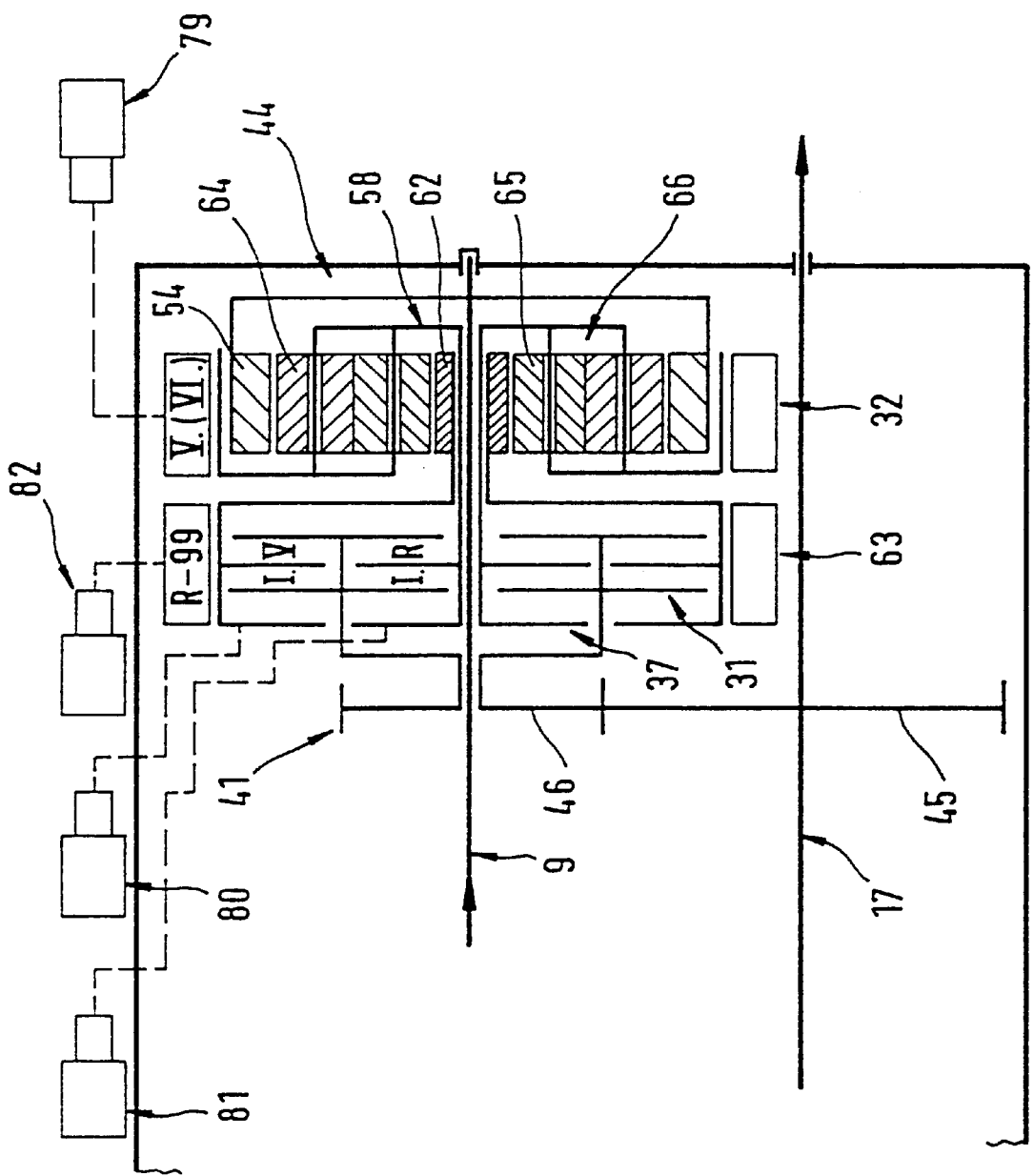

FIG. 1 shows a prior-art change-speed gearbox in a two-shaft embodiment with five forward gears and a reverse gear, in which the synchronizing gear mechanism is designed as a stationary transmission and is used exclusively for synchronization, FIG. 2 shows an embodiment of a change-speed gearbox according to the invention in a two-shaft embodiment with five forward gears and a reverse gear, in which the synchronizing gear mechanism is designed as a stationary transmission, the gear wheel stages of which are each used additionally to form a gear ratio, FIG. 3 shows an embodiment of a change-speed gearbox according to the invention in a three-shaft (layshaft) embodiment with five forward gears and a reverse gear, in which the synchronizing gear mechanism is. designed as a stationary transmission, the gear wheel stages of which are each additionally used to form a gear ratio, FIG. 4 shows an embodiment of a change-speed gearbox according to the invention in a two-shaft embodiment with five forward gears and a reverse gear, in which the synchronizing gear mechanism is designed as an epicyclic mechanism, the two part-ratios of which are each additionally used to form a forward gear, FIG. 5 shows an embodiment of a change-speed gearbox according to the invention in a two-shaft embodiment with five forward gears and a reverse gear, in which the synchronizing gear mechanism is designed as an epicyclic mechanism, each of the two part-ratios of which is additionally used to form a forward gear, FIG. 6 shows an embodiment of a change-speed gearbox according to the invention in a two-shaft embodiment, in which the synchronizing gear mechanism is designed as an epicyclic mechanism, each of the two part-ratios of which is additionally used to form a forward gear, and FIG. 7 shows an embodiment of a change-speed gearbox according to the invention in a two-shaft embodiment with at least five forward gears and a reverse gear, in which the synchronizing gear mechanism is designed as an epicyclic mechanism, each of the at least one forward part-ratios of which and the reverse part-ratio of which is additionally used to form an associated gear ratio.

DESCRIPTION OF EMBODIMENT

In the change-speed gearbox in FIG. 1, an input shaft 9 is connected, on the one hand, to the crankshaft 67 of an engine, by means of an engageable and disengageable main friction clutch 8 used only for purposes of driving away, and, on the other hand, to a parallel output shaft 17, by means of gear wheel stages 10 to 14 of five forward gears I to V and by means of a gear wheel stage 15 of a reverse gear R. The loose wheels 18 to 23 of these six gear wheel stages can be coupled to the output shaft 17 in pairs by means of positive changing gear wheel clutches 24 to 26 without synchronizing elements.

The intermediate gear wheel of gear wheel stage 15, which imparts the reversal in the direction of rotation of the output shaft 17 for the reverse gear R in a known manner, is not shown.

The main clutch 8 and the changing gear wheel clutches 24 to 26 are actuated by servo-operated clutch actuators 68 to 71, which are controlled by an electronic control unit (not shown), which operates as a function, inter alia, of speed sensors 73 and 74 for the actual speeds of the crankshaft 67 and the output shaft 17.

In order to adapt the speed of the loose wheel associated with the new gear to the speed of the output shaft 17 during a gear change, a synchronizing gear mechanism 16 is provided, this being designed as a stationary transmission and being arranged in the power transmission path between the input and output shafts 9 and 17.

The synchronizing gear mechanism 16 has a gear wheel stage 38 with a part-ratio greater than 1, which can be connected into the power transmission path by means of a friction clutch 33 during downshifts into a respectively lower forward gear. The clutch 33, which is arranged coaxially with the input shaft 9 is connected to the loose wheel 50, arranged in the same way, of gear wheel stage 38,. the fixed wheel 49 of which is consequently seated in a rotationally fixed manner on the output shaft 17.

The synchronizing gear mechanism 16 has a gear wheel stage 42 with a part-ratio less than 1, which can be connected into the power transmission path by means of a friction clutch 28 during upshifts into a respectively higher forward gear. The clutch 28 is arranged coaxially with the input shaft 9, is connected to the loose wheel 48 of gear wheel stage 42, the said loose wheel being seated on the input shaft 9, is designed together with the clutch 33 as a changing gear wheel clutch arranged between the loose wheels 48 and 50, and is actuated by a clutch actuator 72 controlled by the electronic control unit. The fixed wheel 47 of gear wheel stage 42, the said wheel meshing with the loose wheel 48, is consequently seated on the output shaft 17.

The change-speed gearbox in FIG. 2 differs from the change-speed gearbox in FIG. 1 in that, in the former, gear wheel stage 38 of the synchronizing gear mechanism 16 is additionally used for the lowest forward gear I instead of gear wheel stage 10, and gear wheel stage 42 of the synchronizing gear mechanism 16 is additionally used for the highest forward gear V instead of gear wheel stage 14. Otherwise, the same reference numerals are used for identical features of the mechanism in both change-speed gearboxes and it is therefore possible to refer to the description of FIG. 1.

In the change-speed gearbox in FIG. 3, an input shaft 9 is connected, on the one hand, to a crankshaft 67 of an engine by means of a main friction clutch 8 that can be engaged and disengaged only for purposes of driving away and, on the other hand, to a parallel layshaft 27 by means of a gearbox constant (gear wheel stage) 75. The gearbox constant 75 comprises a spur gear wheel 76, arranged coaxially with and in a manner fixed in terms of rotation relative to the input shaft 9, and a spur gear wheel 77 that meshes with the said wheel 76 and is arranged coaxially with and in a manner fixed in terms of rotation relative to the layshaft 27. An output shaft 17 arranged coaxially with the input shaft 9 can be brought into driving connection with the layshaft 27 by means of gear wheel stages 11 to 13 associated with forward gears II, III and IV, by means of a gear wheel stage 15 associated with the reverse gear and by means of a synchronizing gear mechanism 16. The loose wheels 19 to 21 and 23 of the gear wheel stages 11 to 13 and 15 associated exclusively with gears are each connected in pairs to a changing gear wheel clutch 25 and 24, respectively, and, as a result, can be coupled selectively to the layshaft 27.

The synchronizing gear mechanism 16 has a gear wheel stage 38 with a transmission ratio greater than 1, which can be connected into the power transmission path by means of a friction clutch 33 when the change-speed gearbox is in the "downshift" synchronization state or is to be changed to the lowest forward gear I. The loose wheel 50 of gear wheel stage 38 and the clutch 33 are both connected to one another and arranged coaxially with the output shaft 17, while the fixed wheel 49 meshing with the loose wheel 50 is arranged in a rotationally fixed manner and coaxially with respect to the layshaft 27. The synchronizing gear mechanism 16 has a gear wheel stage 42 with a transmission ratio less than 1, which can be connected into the power transmission path by means of a friction clutch 28 when the change-speed gearbox is in the "upshift" synchronization state or is to be changed to the highest forward gear V. The loose wheel 48 of gear wheel stage 42 and the clutch 28 are both connected to one another and arranged coaxially with the output shaft 17, while the fixed wheel 47 meshing with the loose wheel 48 is arranged in a rotationally fixed manner and coaxially with respect to the layshaft 27. The clutches 28 and 33 arranged between the loose wheels 48 and 50 are both designed as changing gear wheel clutches and capable of being actuated by a common servo-operated clutch actuator 72. The main clutch 8 and the changing gear wheel clutches 24 and 25 without synchronizing elements can each be actuated by respective servo-operated clutch actuators 68 to 70, all the clutch actuators 68 to 72 being controllable by means of an electronic control unit operating as a function, inter alia, of speed sensors 73 and 74 for the actual values of the speeds of the input and output shafts 9 and 17.

The change-speed gearboxes of FIGS. 4 to 7 differ from the change-speed gearbox of two-shaft construction in FIG. 2 essentially only in that the single gear wheel stage designed as a stationary transmission in the synchronizing gear mechanism 16 of FIG. 2 is replaced by a gear wheel stage designed as an epicyclic mechanism 39 in FIG. 4 or 40 in FIG. 5 or 43 in FIG. 6 or 44 in FIG. 7. The synchronizing gear mechanisms 16 in FIGS. 4 to 7 accordingly have an additional gear wheel stage 42 (FIGS. 4 and 5) or 41 (FIGS. 5 and 6) arranged in series, in the power transmission path, with the associated epicyclic mechanism and designed as stationary transmissions. In the gear wheel stage 42 in FIGS. 4 and 5, the fixed wheel 47 is arranged in a rotationally fixed manner and coaxially with respect to the output shaft 17, and the loose wheel 48 meshing with the fixed wheel is arranged rotatably and coaxially with respect to the input shaft 9. In the gear wheel stage 41 in FIGS. 6 and 7, the fixed wheel 45 is likewise arranged in a rotationally fixed manner and coaxially with respect to the output shaft 17, and the associated loose wheel 46 is arranged rotatably and coaxially with respect to the input shaft 9. Otherwise, identical features of the change-speed gearboxes in FIGS. 2 to 7 are provided with the same reference numerals and it is therefore possible to refer to the associated description of FIG. 2.

In the epicyclic mechanism 39 in FIG. 4, an outer central wheel 51 in continuous driving connection with the input shaft 9 is connected to a planet carrier 59 in continuous driving connection with the loose wheel 48 by an engageable and disengageable friction clutch 29. The clutch 29 can be actuated by means of the clutch actuator 72. Planet wheels 78 mounted rotatably on the planet carrier 59 mesh both with the outer central wheel 51 and with an inner central wheel 55, it being possible to brake the latter fast by means of an engageable and disengageable friction brake 34. The brake 34 can be actuated by means of a servo-operated brake actuator 79, which can be controlled by means of the electronic control unit. In the engaged state of the brake 34 it is possible, on the one hand—when the change-speed gearbox is in the "downshift" synchronization state—for the input shaft 9 to be driven with a speed increase by the epicyclic mechanism 39; on the other hand, the epicyclic mechanism 39 is in a part-ratio greater than 1 for the lowest forward gear I. With the clutch 29 engaged, the epicyclic mechanism 39 revolves as a block, with the result that, on the one hand—when the change-speed gearbox is in the "upshift" synchronization state—the speed of the input shaft 9 can be reduced by means of the gear wheel stage 42; on the other hand, a transmission ratio less than 1 is effective by way of the gear wheel stage 42, with the result that the highest forward gear V is selected.

In the change-speed gearbox in FIG. 5, the loose wheel 48 of the gear wheel stage 42 is connected in a rotationally fixed manner to a planet carrier 60 of the epicyclic mechanism 40, on which carrier planet wheels 78 are rotatably mounted which are in mesh both with an inner central wheel 52 and with an outer central wheel 56. The planet carrier 60 is connected by means of an engageable and disengageable friction clutch 29 with the outer central wheel 56, which can furthermore be braked fast by means of an engageable and disengageable friction brake 35. The clutch 29 can be actuated by means of the clutch actuator 72, while the brake 35 can be actuated by means of a servo-operated brake actuator 79 that can be controlled by the electronic control unit. In the engaged state of the clutch 29, it is possible, on the one hand—when the change-speed gearbox is in the "upshift" synchronization state—for the speed of the input shaft 9 to be reduced by way of the gear wheel stage 42; on the other hand, the change-speed gearbox is set to the highest forward gear V by virtue of the effective part-ratio of the gear wheel stage 42. In the engaged state of the brake 35, a part-ratio greater than 1 is effective in the epicyclic mechanism 40, with the result that, on the one hand,—when the change-speed gearbox is in the "downshift" synchronization state—the speed of the input shaft 9 can be increased; on the other hand, the transmission ratio of the lowest forward gear I is selected between the input and the output shaft 17.

In the change-speed gearbox in FIG. 6, the loose wheel 46 of the gear wheel stage 41 is connected in a rotationally fixed manner to an inner central wheel 61 of the epicyclic mechanism 43, the planet carrier 53 of which, which is connected in a rotationally fixed manner to the input shaft 9, supports planet wheels 78, which mesh both with the inner central wheel 61 and with an outer central wheel 57. The outer central wheel 57 can be braked fast by means of an engageable and disengageable friction brake 30, which can be actuated by means of a servo-operated brake actuator 79 controlled by the electronic control unit. The planet carrier 53 is connected to the inner central wheel 61 by an engageable and disengageable friction clutch 36, which can be actuated by means of the clutch actuator 72. In the engaged state of the clutch 36, the epicyclic mechanism 43 revolves as a block, with the result that, on the one hand,—when the change-speed gearbox is in the "downshift" synchronization state—the speed of the input shaft 9 can be increased by means of the gear wheel stage 41 with the part-ratio greater than 1; on the other hand, the change-speed gearbox is set to the lowest forward gear I by virtue of the effective gear wheel stage 41. In the engaged state of the brake 30, the epicyclic mechanism 43 is set to a part-ratio less than 1, with the result that, on the one hand,—when the change-speed gearbox is in the "upshift" synchronization state—the speed of the input shaft 9 can be reduced; on the other hand, the change-speed gearbox is set to the highest forward gear V.

In the change-speed gearbox in FIG. 7, the loose wheel 46 of the gear wheel stage 41 is connected to the inner central wheel 62 of the epicyclic mechanism 44 by means of an engageable and disengageable friction clutch 31 and by an engageable and disengageable friction clutch 37 to the planet carrier 58 of the epicyclic mechanism 44, the outer central wheel 54 of which is connected in a rotationally fixed manner to the input shaft 9. Twin planets 66, each of which comprises two intermeshing individual planets 64 and 65, are supported on the planet carrier 58, which can furthermore be braked fast by means of an engageable and disengageable friction brake 32. The individual planets 64 additionally mesh with the outer central wheel 54, while the individual planets 65 additionally mesh with the inner central wheel 62, which can also be braked fast by means of an engageable and disengageable friction brake 63. The brakes 32 and 63 can each be actuated by means of a servo-operated brake actuator 79 and 82, respectively—while the clutches 31 and 37 can each be actuated by means of a servo-operated clutch actuator 80 and 81, these actuators in turn being controlled by the electronic control unit. In the engaged state of the clutch 31 and the brake 32, the loose wheel 46 is connected to the inner central wheel 62 and the planet carrier 58 is braked fast. In this way, the epicyclic mechanism 44 is set to a part-ratio of less than 1 with the result that, on the one hand—when the change-speed gearbox is in the "upshift" synchronization state—the speed of the input shaft 9 can be reduced; on the other hand, the change-speed gearbox has been set to the transmission ratio of the highest forward gear V. In the engaged state of the clutches 31 and 37,the epicyclic mechanism 44 revolves as a block, as a result of which the part ratio greater than 1 of the gear wheel stage 41 is effective, with the result that, on the one hand,—when the change-speed gearbox is in the "downshift" synchronization state, the speed of the input shaft 9 can be increased; on the other hand, the change-speed gearbox has been set to the transmission ratio of the lowest forward gear I. In the engaged state of clutch 37 and brake 63, the loose wheel 46 of the-gear wheel stage 41 are connected to the planet carrier 58 and the inner central wheel 62 is braked fast. The change-speed gearbox has thus been set to the reverse gear R.

Description of the gear-change and synchronizing processes:

Selection of First and Reverse Gear (FIGS. 1 and 2)

Referring to FIG. 1, the main (drive-away) clutch 8 is disengaged by means of the clutch actuator 68. The input shaft 9 is braked on the stationary output shaft 17 by means of the clutch 28. The changing gear wheel clutch 24 can now be activated by means of the clutch actuator 69 to select the gear wheel stage 10 of first gear or the gear wheel stage 15 of reverse gear. Referring to FIG. 2, the gear wheel stage 38 of the synchronizing mechanism 16, the said gear wheel stage also being used as a transmission ratio for first gear, can be connected into the power transmission path by means of the clutch 33. In both cases, driving and driving away in first or reverse gear is possible by way of the main clutch 8.

Changing up from First to Second Gear

Referring to FIG. 1, the changing gear wheel clutch 24 is actuated into its neutral position to disengage the gear wheel stage 10 of first gear. At the same time, the clutch 28 is activated to connect the gear wheel stage 42 into the power transmission path. As a result, the input shaft 9 is braked until the loose wheel 19 of the gear wheel stage 11 of second gear has reached the speed of the output shaft 17. When this synchronizing process is complete, the changing gear wheel clutch 25 can be actuated to engage the gear wheel stage 1 of second gear. Referring to FIG. 2, the clutch 33 is disengaged to disengage the gear wheel stage 38 of first gear. At the same time, the clutch 28 is engaged to engage the gear wheel stage 42, with the result that the input shaft 9 is braked until it has reached the synchronous speed of second gear and the changing gear wheel clutch 24 can thus be actuated to engage the gear wheel stage 11 of second gear.

All the other gears can be selected in the corresponding manner by means of one of the two gear wheel stages of the synchronizing mechanism 16, i.e. depending on the direction of selection (upshift or downshift), the speed of the input shaft 9 is influenced in such a way that the desired gear can be selected when the synchronous speed is reached. Fundamentally, it can be stated that the gear wheel stages of the synchronizing mechanism 16 can be designed as gear stages if the geometrical conditions (installation space and gear-stage configuration) permit. In the simplest embodiment, it is conceivable to use just one of the two gear wheel stages for a forward gear. If both gear wheel stages are used for the lowest and the highest forward gear, however, the option of upshifting or downshifting is freely selectable, given the selection of an intermediate gear. Referring to the change-speed gearbox in the FIGS. 4 to 6, in which one gear wheel stage is designed as an epicyclic mechanism, gear changing takes place by way of the synchronizing mechanism 16 in a manner similar to that in the embodiments in FIGS. 1 and 2. Here too, at least one of the two gear wheel stages of the synchronizing mechanism 16 can be used as a driving gear.

Selecting First and Reverse Gear (FIG. 6)

The main (drive-away) clutch 8 is opened. The clutch 36 of the epicyclic mechanism 43 is engaged, with the result that the input shaft 9 is braked to zero. It is then possible either for the reverse gear to be selected by engaging the gear wheel stage 15 by actuating the changing gear wheel clutch 24 or, while retaining the engaged state of the clutch 36 and thus the effectiveness of the transmission ratio of the gear wheel stage 41, which is designed to be equal to the transmission ratio of first gear, to drive away by engaging the main clutch 8 in first gear.

Changing Up from First to Second Gear (FIG. 6)

The clutch 36 is disengaged and the brake 30 is engaged. As a result, the epicyclic mechanism 43 has a braking effect on the input shaft 9, so that, when the synchronous speed is reached, the changing gear wheel clutch 24 can be actuated by means of the clutch actuator 69 to engage the gear wheel stage 11 of second gear.

Changing Up From Fourth Gear to Fifth Gear (FIG. 6)

The gear wheel stage 13 of fourth gear is disengaged by actuating the changing gear wheel clutch 25 into its neutral position. After this, the brake 30 is engaged, with the result that the planet carrier 53 drives the inner central wheel 61 with a speed increase and thus drives the output shaft 17 with the transmission ratio of fifth gear.

Changing Down from Fifth Gear to Fourth Gear (FIG. 6)

The brake 30 is disengaged and the clutch 36 is engaged, with the result that the input shaft 9 is accelerated to the synchronous speed of fourth gear by the output shaft 17 via the gear wheel stage 41. Once the synchronous speed has been reached, the clutch 36 is disengaged, and the gear wheel stage 13 of fourth gear is simultaneously engaged by actuating the changing gear wheel clutch 25.

If not already described above, selection of first gear or reverse gear and gear change movements and synchronizing processes in the change-speed gearboxes in FIGS. 4, 5 and 7 are obtained in a similar manner to the corresponding functions in the change-speed gearbox in FIG. 6.

Although the invention has been described in detail with reference to certain preferred embodiments and specific examples, variations and modification exist within the scope and spirit of the invention as described and as defined in the following claims.

What is claimed is:

1. A change-speed gearbox, in which an input shaft continuously connected to an engageable and disengageable main friction clutch can be brought into driving connection with an output shaft by means of gear wheel stages, each associated with one gear ratio, or by means of a central synchronizing gear mechanism, and in which the loose wheels of the gear wheel stages associated with the gear ratios can each be coupled to their shaft by means of an associated gear wheel clutch without synchronizing elements, and in which, in the event of a gear change to a higher gear, the synchronizing gear mechanism can be brought into an "upshift" synchronization state by engagement of an associated frictional connection, in which state the speed of the input shaft can be adjusted to the lower synchronous speed corresponding to the higher gear to be selected, and in which, in the event of a gear change to a lower gear, the synchronizing gear mechanism can be brought into a "downshift" synchronization state by engaging an associated frictional connection, in which state the speed of the input shaft can be adjusted to the higher synchronous speed corresponding to the lower gear to be selected, a gear wheel stage having a transmission ratio greater than 1, the said gear wheel stage belonging to the synchronizing gear mechanism, being connected into the drive connection between the input and the output shaft in the "downshift" synchronization state, characterized in that the main clutch is held in the engaged state during each gear change, and a gear wheel stage having a transmission ratio less than 1 in the synchronizing gear mechanism being connected into the drive connection between the input and the output shaft in the "upshift" synchronization state.

2. The change-speed gearbox according to claim 1, characterized in that the gear wheel stage having the transmission ratio less than 1 in the synchronizing gear mechanism is additionally connected into the drive connection between the input and the output shaft in one of the upper forward gears.

3. The change-speed gearbox according to claim 2, characterized in that the gear wheel stage having the transmission ratio greater than 1 in the synchronizing gear mechanism is connected into the drive connection between the input and the output shaft in one of the lower forward gears.

4. The change-speed gearbox according to claim 3, characterized in that the two frictional connections of the synchronizing gear mechanism are arranged coaxially with the input shaft.

5. The change-speed gearbox according to claim 3, characterized in that the gear wheel stage associated with one synchronization state is in the form of a stationary transmission, and the gear wheel stage associated with the other synchronization state is in the form of an epicyclic mechanism.

6. The change-speed gearbox according to claim 5, characterized in that the stationary transmission and the epicyclic mechanism are arranged in series in the power transmission path.

7. The change-speed gearbox according to claim 6, characterized in that a first transmission element of the epicyclic mechanism has a continuous drive connection with the input shaft.

8. The change-speed gearbox according to claim 7, characterized in that a second transmission element of the epicyclic mechanism is connected to a brake to form a part-ratio greater or less than 1.

9. The change-speed gearbox according to claim 8, characterized in that a third transmission element of the epicyclic mechanism has a drive connection with a gear wheel of the stationary transmission.

10. The change-speed gearbox according to claim 9, characterized in that the gear wheel of the stationary transmission is a loose wheel.

11. The change-speed gearbox according to claim 9, characterized in that the third transmission element in the epicyclic mechanism is a central wheel.

12. The change-speed gearbox according to claim 9, characterized in that the third transmission element in the epicyclic mechanism is a planet carrier.

13. The change-speed gearbox according to claim 12, characterized in that the epicyclic mechanism has at least one part-ratio for forward travel and one part-ratio for reverse travel, and the part-ratios are each involved in the formation of a respectively associated gear ratio.

14. The change-speed gear mechanism according to claim 13, characterized in that the epicyclic mechanism has twin planets, each formed by two intermeshing individual planets, of which one individual planet meshes with an outer central wheel and the other individual planet meshes with an inner central wheel, in that the outer central wheel has a continuous drive connection with the input shaft, and in that the inner central wheel and the planet carrier can each alternately be either braked or brought into drive connection with the output shaft.

15. The change-speed gearbox according to claim 14, characterized in that the inner central wheel and the planet carrier can be brought jointly into drive connection with the output shaft.

16. The change-speed gearbox according to claim 8, characterized in that the transmission element in the epicyclic mechanism which is connected to the brake is a central wheel.

17. The change-speed gearbox according to claim 16, characterized in that the transmission element in the epicyclic mechanism which is in drive connection with the input shaft is a central wheel.

18. The change-speed gearbox according to claim 17, characterized in that the transmission element in the epicyclic mechanism which is in drive connection with the input shaft is a planet carrier.

19. The change-speed gearbox according to claim 1, characterized in that the output shaft is parallel to the input shaft, and both the gear wheel stages associated exclusively with the gears and the synchronizing gear mechanism each in terms of their action establish a direct driving connection between the input and the output shaft.

20. The change-speed gearbox according to claim 1, characterized in that the output shaft is coaxial with the input shaft, and both the gear wheel stages associated exclusively with the gears and the synchronizing gear mechanism each in terms of their action establish an indirect drive connection between the input and the output shaft by way of a layshaft.

* * * * *

UNITED STATES PATENT AND TRADEMARK OFFICE
CERTIFICATE OF CORRECTION

PATENT NO. : 6,440,031 B1
DATED : August 27, 2002
INVENTOR(S) : Eberspächer et al.

It is certified that error appears in the above-identified patent and that said Letters Patent is hereby corrected as shown below:

Column 3,
Lines 19-20, delete "The invention is described in greater detail below by";
Line 22, change "BRIEF DESCRIPTION OF THE INVENTION" to -- BRIEF DESCRIPTION OF THE DRAWINGS --; and
Line 65, change "DESCRIPTION OF EMBODIMENT" to -- DESCRIPTION OF EMBODIMENTS --.

Signed and Sealed this

Thirtieth Day of March, 2004

JON W. DUDAS
*Acting Director of the United States Patent and Trademark Office*